United States Patent
Egolf et al.

(10) Patent No.: US 11,150,037 B2
(45) Date of Patent: Oct. 19, 2021

(54) HEAT EXCHANGE APPARATUS

(71) Applicant: Baltimore Aircoil Company, Inc., Jessup, MD (US)

(72) Inventors: Kevin Egolf, Hampstead, MD (US); David Andrew Aaron, Reisterstown, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 88 days.

(21) Appl. No.: 14/738,281

(22) Filed: Jun. 12, 2015

(65) Prior Publication Data

US 2016/0363388 A1 Dec. 15, 2016
US 2021/0190440 A9 Jun. 24, 2021

Related U.S. Application Data

(60) Provisional application No. 62/062,539, filed on Oct. 10, 2014.

(51) Int. Cl.
*F28F 1/00* (2006.01)
*F28D 1/047* (2006.01)
(Continued)

(52) U.S. Cl.
CPC .......... *F28F 9/26* (2013.01); *F28C 1/14* (2013.01); *F28D 1/0477* (2013.01); *F28D 5/02* (2013.01)

(58) Field of Classification Search
CPC .. F28F 1/00; F28F 1/006; F28D 1/047; F28D 1/0341; F28D 1/0477; F28D 1/0475;
(Continued)

(56) References Cited

U.S. PATENT DOCUMENTS 3,346,043 A * 10/1967 Thurnauer ............ F22B 37/142
122/510
4,366,106 A * 12/1982 Benyak .................... F28B 1/06
165/178
(Continued)

FOREIGN PATENT DOCUMENTS

CN 1690639 A 11/2005
CN 103791747 A 5/2014
(Continued)

OTHER PUBLICATIONS

Chinese Patent Office, Office Action and Search Report and translations dated Apr. 1, 2017, from corresponding Chinese Patent Application No. 201511005503.9, 13 pages.
(Continued)

*Primary Examiner* — Harry E Arant
(74) *Attorney, Agent, or Firm* — Fitch, Even, Tabin & Flannery LLP

(57) ABSTRACT

An improved heat exchange apparatus is provided with an indirect evaporative heat exchange section consisting of a series of serpentine tubes which are kept uniformly spaced in the return bend section. Providing uniform return bend spacing on the return bend ends allow for ease of circuit assembly (stacking), ease of coil pull-down, ease of manufacturing, reduction in production cost, produces a higher quality hot dip galvanizing process and is a more robust design that tolerates manufacturing variability issues such as variable tube circuit length and variable return bend angles. Uniform return bend spacing also reduces scaling relative to prior art designs which had wet/dry areas resulting from shadowed tubes which were non-uniformly spaced, provides for better inspection and access to the tubes in the return bend area, maintains uniform air passage around tubes, promotes better tube wetting of the return bend area and
(Continued)

ultimately promotes higher quality and higher performing heat exchanger coils.

16 Claims, 8 Drawing Sheets

(51) Int. Cl.
 *F28F 9/26* (2006.01)
 *F28D 5/02* (2006.01)
 *F28C 1/14* (2006.01)
(58) Field of Classification Search
 CPC .......... F28D 7/0116; F28D 7/005; F28D 5/02; F28D 7/08; F28D 7/082; F28D 7/087; F28C 1/14; Y02B 30/70
 See application file for complete search history.

(56) References Cited

U.S. PATENT DOCUMENTS

| | | | |
|---|---|---|---|
| 6,820,685 B1 * | 11/2004 | Carter | ............... F28B 1/06 165/150 |
| 7,779,898 B2 | 8/2010 | Morrison | |
| 9,255,739 B2 | 2/2016 | Aaron | |
| 9,476,656 B2 * | 10/2016 | Anwar | ................. F28F 13/12 |
| 9,587,885 B2 | 3/2017 | Aaron | |
| 2008/0022949 A1 * | 1/2008 | Harth | ................. F22B 37/202 122/511 |
| 2014/0196872 A1 | 7/2014 | Anwar | |
| 2014/0264974 A1 | 9/2014 | Aaron et al. | |

FOREIGN PATENT DOCUMENTS

| | | |
|---|---|---|
| DE | 4316875 A1 | 11/1993 |
| EP | 0276791 A1 | 8/1988 |
| EP | 2322854 A1 | 5/2011 |
| WO | 2008017571 A1 | 2/2008 |

OTHER PUBLICATIONS

European Patent Office, Extended European Search Report dated Jun. 28, 2016, from corresponding European Patent Application No. 15188326.1, 6 pages.

Chinese Patent Office, Office Action dated Sep. 4, 2017, from corresponding Chinese Patent Application No. 201511005503.9, 5 pages.

* cited by examiner

HEAT EXCHANGE APPARATUS

RELATED APPLICATIONS

The application claims the benefit of U.S. provisional application 62/062,539, filed Oct. 10, 2014, the entirety of which is hereby incorporated herein by reference.

BACKGROUND OF THE INVENTION

The present invention relates generally to an improved indirect heat exchanger such as a closed circuit fluid cooler, fluid heater, condenser, evaporator, thermal storage system, air cooler or air heater. More specifically, the present invention relates to a tube bundle in which uniform tube spacing is maintained in the return bend section of the tube bundle which allows for ease of circuit assembly, ease of coil pull-down, ease of manufacturing, reduction in production cost, produces a higher quality hot dip galvanizing process and is a more robust design that tolerates manufacturing variability issues such as variable tube circuit length and variable return bend angles. Uniform return bend spacing also reduces scaling relative to prior art designs which had wet/dry areas resulting from shadowed tubes caused from non-uniformly spaced return bend sections. Uniform return bend spacing also provides for better inspection and access to the tubes in the return bend area, maintains uniform air passage around tubes, promotes better tube wetting of the return bend area, ultimately promoting higher quality heat exchange coils with higher unit thermal capacity.

Such indirect heat exchangers may also be used in conjunction with direct heat exchangers and are usually comprised of a series of serpentine tube runs with each tube run providing a circuit of a coil. When prior art designs of the return bend section of a coil circuit arrangement have two approximate 90 degree bend angles separated by a straight tube run usually greater than 2 inches, the return bends can float and can stack unevenly which promotes uneven tube spacing in the return bend area. This situation can become worse after the tube bundle is hot dip galvanized. The degree of freedom for the coil circuits to become non-uniformly spaced at the return end becomes worse as the distance between the two approximate 90 degree bends becomes longer.

Various number of coil geometries including but not limited to double serpentine coils, quad-coils, hex-coils and octo-coils are possible in accordance with the present invention. All such arrangements can benefit from the improved design of the return bend sections of the coil.

In double serpentine coil geometry, there is a top and a bottom tube that are paired coming out of the coil header which are offset at different levels. There can be any number of sets of circuits across the header but the double serpentine design feeds two circuits, a top and a bottom circuit at a time. So for example, a coil with 44 circuits would have 22 sets of double serpentine feeds and could have any number of passes back and forth but typically have passes between 2-20 passes. So for example a coil with 12 passes between the top and bottom headers would have 11 return bends. At each return bend end of the coil, when using one bend of approximately 180 degrees, these circuits cross at one intersection point and these are generally not a problem due to their close proximity. However, when the tube runs are separated by a distance, meaning there would be two approximate 90 degree bends separated by a straight tube run, there can be one intersection point between the top and bottom circuit and it is desired that the return bend section touches for the entire length of the section of tube in between the two 90 degree bends such that uniform spacing is maintained at the return bend section on both sides of the coil. In practice however, when the coil circuits are assembled and pulled down, which is required to maintain the coil's design width, the return bend section tubes, especially those tube runs that are separated by a straight tube run, will have a degree of freedom due to manufacturing variability and not maintain a uniform spacing. To remedy the situation, in the preferred embodiment, one circuit is designed such that it has a slight under-break compared to 90 degrees and will purposely have an approximate bend angle of 100 degrees. To compliment this, after a straight tube run section of typically 2 inches or longer, the next bend in the circuit will be over-broken from 90 degrees to approximately 80 degrees such that both angles add up to an approximate 180 degree bend. If the tubes are sloped, as known in the industry, then the two bends, one slightly over broke and one slightly under broke will add up to an to an angle slightly greater than 180 degrees. This inventive return bend circuit design allows for three definite points of contact in the return bend area which locks the return bends in a secure fashion such that uniform spacing is preserved in the return bend sections of the coil. One unique feature of this preferred embodiment is that the tube circuit may be flipped over such that there is only one circuit design per coil and the three point contact is maintained just by flipping the circuits in opposite directions before the coil is stacked.

In addition to the embodiments relating to any type of heat exchanger employed, the type of fan system whether induced or forced draft, belt drive, gear drive or direct drive can be used with all embodiments presented. The type of fan whether axial, centrifugal or other can be used with all embodiments presented. The type of tubes, material of tubes, tube diameters, tube shape, whether finned or un-finned, the number of tube passes, number of return bends, number of increased vertical spaces, can be used with all embodiments presented. If the indirect coil employs the use of direct heat exchange medium, as indicated in patent application Ser. Nos. 13/833,788, 13,833,971 and 62/061,894, the type of fill, whether efficient counterflow fill, contaminated water application fills or any material fill can be used with all embodiments presented.

Accordingly, it is an object of the present invention to provide an improved heat exchange apparatus, which could be a closed circuit fluid cooler, fluid heater, condenser, evaporator, air cooler or air heater, which includes an indirect heat exchange section with uniformly spaced return bends.

It is another object of the present invention to provide an improved heat exchange apparatus such as a closed circuit fluid cooler, fluid heater, condenser, evaporator, air cooler or air heater, including an indirect heat exchange section that allows for easier assembly (stacking), ease of pull down, ease of manufacturing and reduction in production cost.

It is another object of the present invention to provide an improved heat exchange apparatus such as a closed circuit fluid cooler, fluid heater, condenser, evaporator, air cooler or air heater which provides uniform spacing between circuits in the return bend area to maintain a uniform air passage, promote better tube wetting of the return bend area, promote higher thermal capacity and reduced scaling from wet/dry areas resulting from previously shadowed tubes.

It is another object of the present invention to provide an improved heat exchange apparatus such as a closed circuit fluid cooler, fluid heater, condenser, evaporator, air cooler or air heater which provides for better inspection and access to the tubes in the return bend area.

It is another object of the present invention to provide an improved heat exchange apparatus such as a closed circuit fluid cooler, fluid heater, condenser, evaporator, air cooler or air heater, including an indirect heat exchange section that locks the return bends in a secure fashion such that uniform spacing is preserved in the return bend sections of the coil which produces a higher quality result before and after the hot dip galvanizing process.

SUMMARY OF THE INVENTION

The present invention provides an improved heat exchange apparatus which provides improved quality and performance of serpentine coils by utilizing a means to maintain a uniform spacing in the return bend section of the heat exchanger. Assured uniform spacing on the return bend end allows for ease of circuit assembly (stacking), ease of coil pull-down, ease of manufacturing, reduction in production cost, produces a higher quality hot dip galvanizing process and is a more robust design that tolerates manufacturing variability issues such as variable tube circuit length and variable return bend angles. Uniform return bend spacing also reduces scaling relative to prior art designs which had wet/dry areas resulting from shadowed tubes which were non-uniformly spaced, provides for better inspection and access to the tubes in the return bend area, maintains uniform air passage around tubes, promotes better tube wetting of the return bend area, ultimately promoting higher quality heat exchange coils with unit thermal capacity improvement.

BRIEF DESCRIPTION OF THE DRAWINGS

The invention will be described with reference to the following drawings, wherein.

DESCRIPTION OF THE PREFERRED EMBODIMENT

Figure 1:
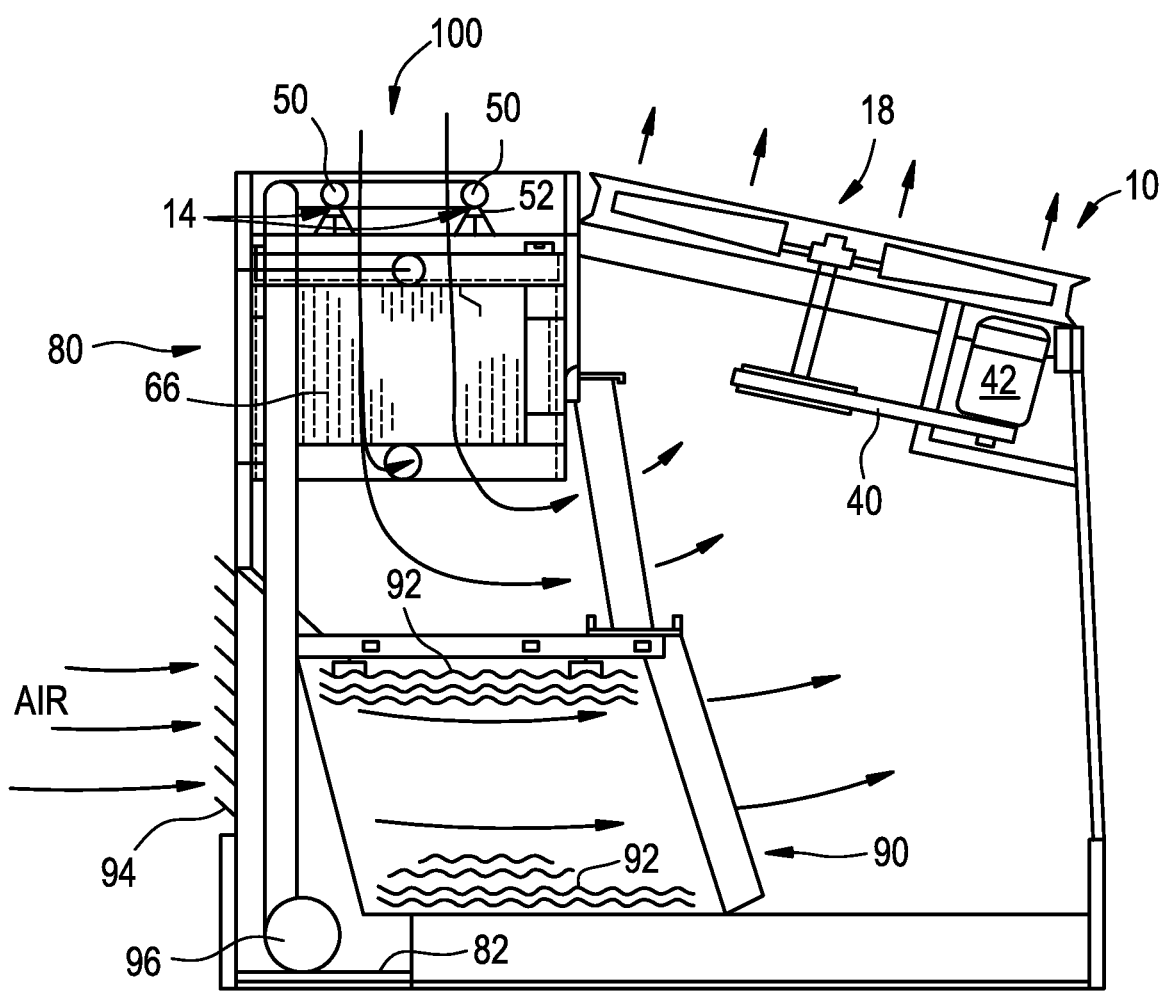
FIG. 1 is a side elevation view in partial section of an exemplary heat exchanger of a coil/fill type including an indirect evaporative heat exchanger section and a direct evaporative heat exchange section incorporating an indirect heat exchange tube bundle according to the present invention.

FIGS. 1,2,3 & 4 are used to describe prior art. Now referring to FIG. 1, this may be a first exemplary heat exchanger to which the inventive improved tube coil assembly can be provided. The heat exchanger apparatus 10 is of the coil/fill type and may serve as a closed-circuit cooling tower. Generally, apparatus 10 includes an enclosure structure which contains a multi-circuit indirect evaporative fluid cooling section or indirect heat exchange section 80, a direct evaporative heat exchange section 90, a lowermost evaporative liquid collection sump 82 that delivers liquid to an uppermost water spray assembly 14 through a pipe distribution system 50 with nozzles 52, and a fan assembly 18. The water assembly 14 sprays an evaporative liquid downwardly through indirect heat exchange section 80. The fan 18, driven by motor 42 through belt 40, moves a stream of air through each of the heat exchange sections 80 and 90, although natural draft is also a viable means for moving the air. Fan 18 can either be an induced or forced draft centrifugal fan or a common propeller type of fan.

Apparatus 10 has many applications in the heat exchange field. For example, apparatus 10 may be used to cool a single phase, sensible fluid such as water, which is flowing within an externally-supplied closed circuit system, or it may be used to desuperheat and condense a multi-phase, sensible and latent fluid such as a refrigerant gas, also supplied from an external closed-circuit system. Finally, the operable field of use for apparatus 10 also includes duty as a wet air cooler, where the air discharged is piped offsite to be used as a fresh, cooled air supply for an operation such as mining. As will become evident, the tower structures containing the above-mentioned components can also be arranged and formed in a number of different ways; apparatus 10 is not limited to strictly one shape or arrangement.

The indirect heat exchange section 80, which is comprised of a single coil assembly having an array of tubes 66, is superposed above the direct evaporative heat exchange section 90. The indirect heat exchange section 80 receives a flowing hot fluid to be cooled from an offsite process and it is cooled in this section by a combination of indirect sensible heat exchange and a direct evaporative heat exchange. The evaporative liquid, which is usually cooling water, is sprayed downwardly by assembly 14 onto the indirect section 80, thereby exchanging indirect sensible heat with the fluid to be cooled, while a stream of ambient air entering primary air inlet 100, evaporatively cools the evaporative liquid as the two mediums move generally downwardly through the coil assembly. In this particular embodiment, the entering air stream 100 is shown entering and flowing in a direction which is generally parallel or concurrent with the direction of cooling water across indirect heat exchanger 80, although the air flow stream is not limited to any particular flow pattern, as will become evident later on where a crosscurrent air flow pattern will be explained. Once the air and water cooling mediums reach the bottom side of indirect section 80, they split, with the air stream being pulled by fan 18, while the water gravitationally descends into direct heat exchange section 90. The air is then discharged from apparatus 10 by the fan, while the water is cooled in the direct heat exchange section as will be explained shortly.

The direct evaporative heat exchange section 90 functions to cool the water that is heated and descending from the indirect heat exchange section 80. Direct evaporative heat exchange section 90 is comprised of an array of tightly-spaced, parallel, plastic sheets which form a fill bundle 92, although fill 92 could be formed by conventional splash-type fill. The hot water received by fill bundle 92 from indirect section 80 is distributed across each fill sheet so that a source of outside ambient air which enters a secondary air inlet 94 evaporatively cools the hot water descending the sheets. Here, the ambient air stream is shown entering direct section 90 in a crosscurrent fashion to the descending hot water draining through the fill bundle 92, although other air flow schemes can be used. The cooled spray water is then pumped from lower most collection sump 82 by pump 96 back up to uppermost water spray assembly 14.

Figure 2:
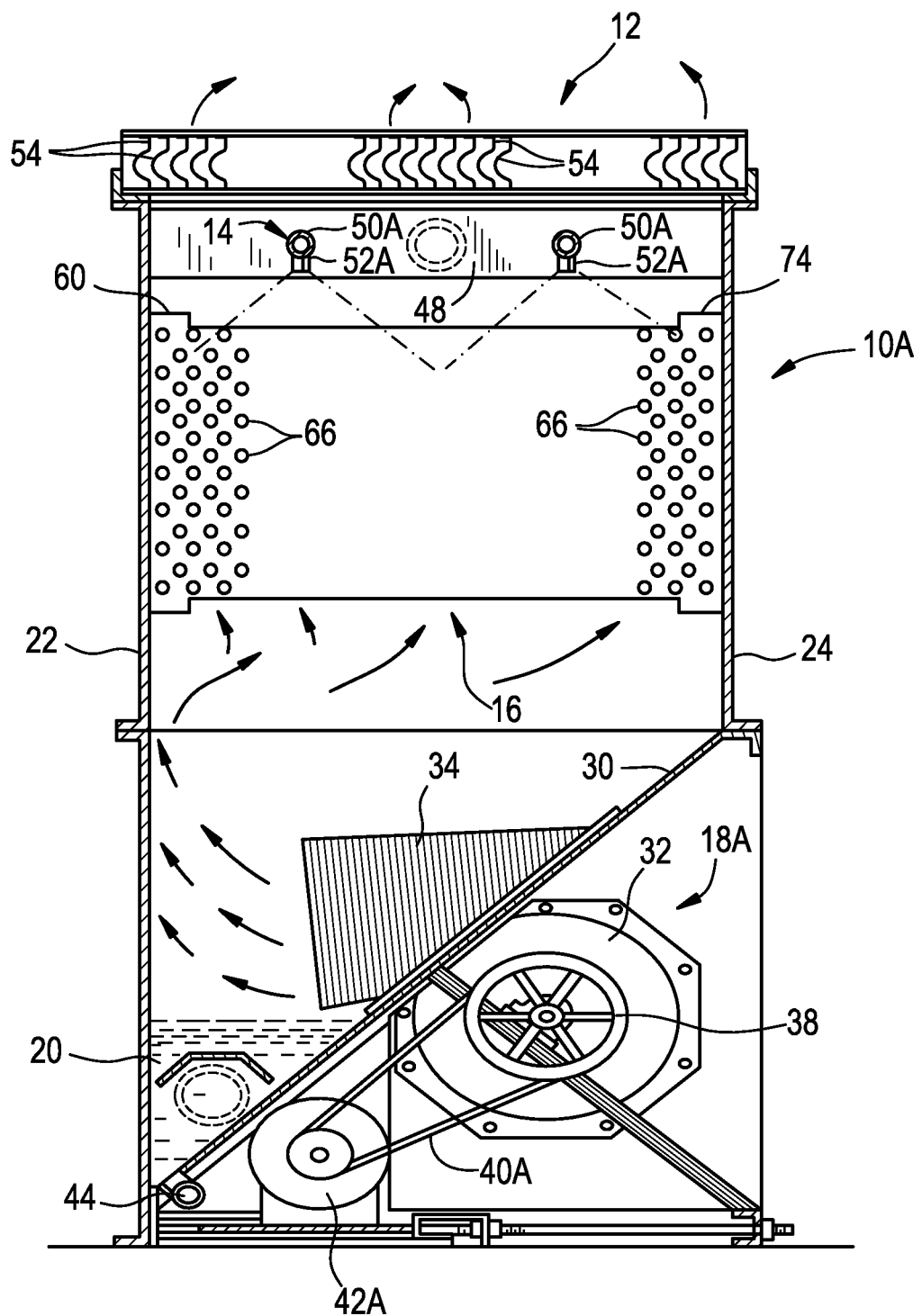
FIG. 2 is a side view of another exemplary embodiment of the invention in which the indirect coil assembly is provided in a coil only type heat exchanger.
Figure 3:
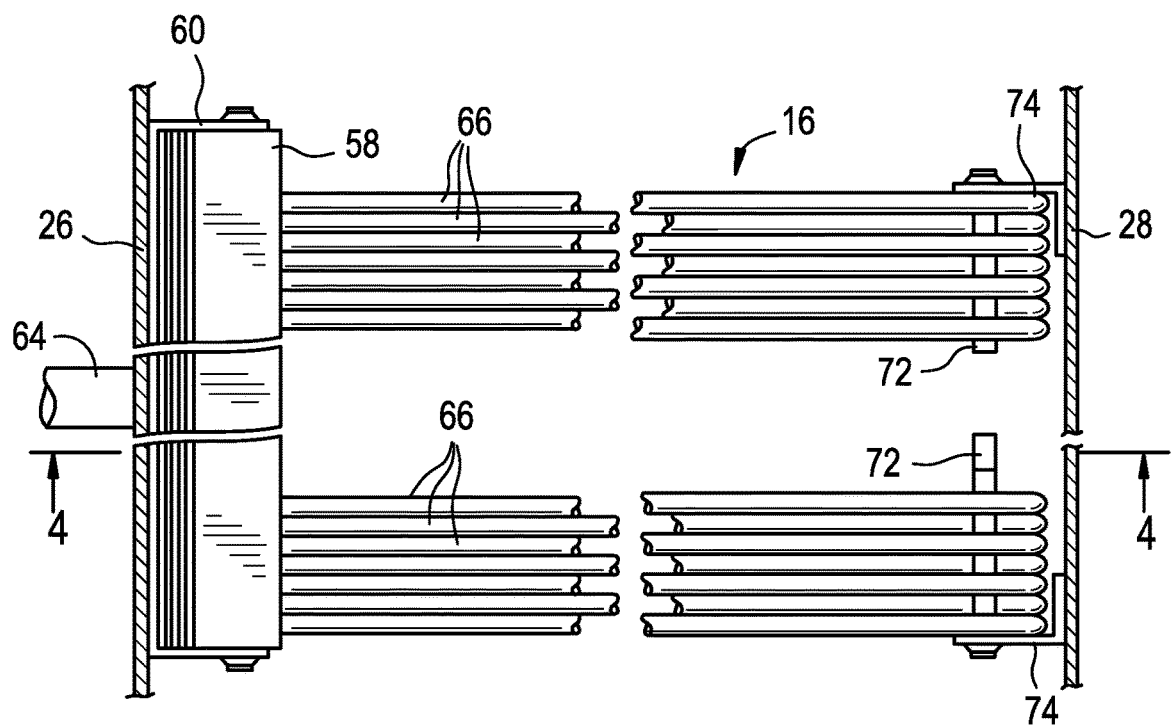
FIG. 3 is a plan view in partial section of the heat tube bundle in the exemplary heat exchangers of FIGS. 1 and 2.
Figure 4:
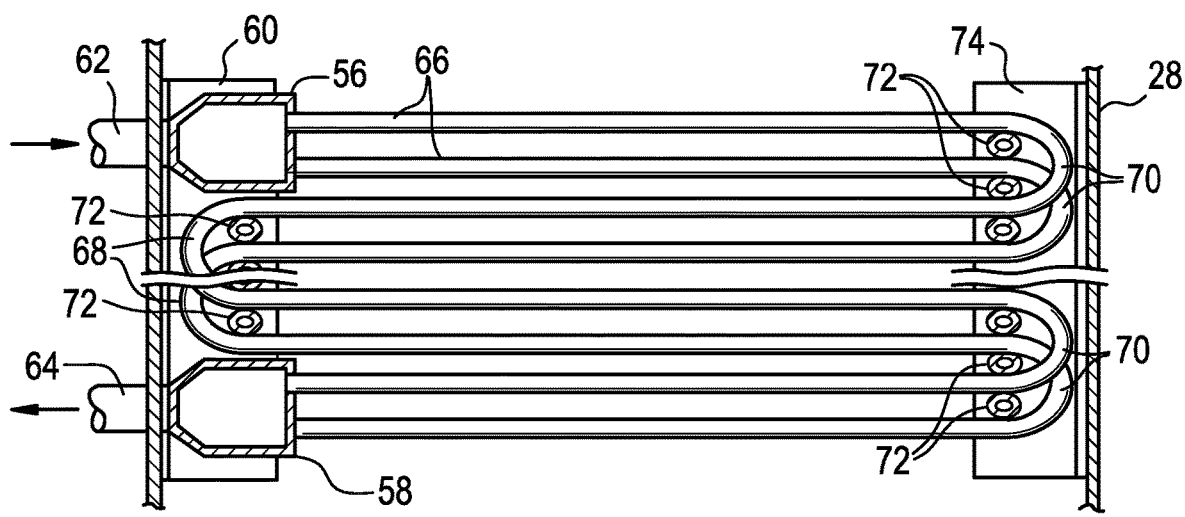
FIG. 4 is a view taken along line 4-4 of FIG. 3.

Now referring to FIG. 2, a second exemplary heat exchanger to which the inventive tube coil assembly can be provided includes a generally vertical conduit 10A of sheet metal construction and having, at different levels in the interior thereof, an upper mist eliminator assembly 12, a water spray assembly 14A, a coil assembly 16, a fan assembly 18A and a lower water collection sump 20. The vertical conduit 10A may be of rectangular, generally uniform, cross-section and comprises vertical front and rear walls 24 and 22 (FIG. 2) and vertical side walls (not shown). A diagonal wall 30 extends downwardly from the front wall 24 to the bottom of the rear wall 22 to define the lower water collection sump 20. The fan assembly 18A is positioned behind and below the diagonal wall 30. However, this is merely one illustrative example of placement. Other conventional or subsequently developed arrangements can be substituted. The fan assembly comprises a pair of centrifugal fans 32 each of which has an outlet cowl 34 which projects through the diagonal wall 30 and into the conduit 10 below the coil assembly 16. The fans 32 may share a common drive axle turned by means of a driven pulley 38 connected through a belt 40A to a drive motor 42A. A recirculation line 44 may be arranged to extend through the side wall (not shown) of the conduit 10A near the bottom of the lower water collection sump 20 to recirculate water back up to the water spray assembly 14A by a water pump (not shown). The water spray assembly 14A comprises spray water pipes 50A fitted with a plurality of nozzles 52A which emit water sprays to provide an even distribution of water over the entire coil assembly 16.

The mist eliminator assembly 12 comprises a plurality of closely spaced elongated strips 54 which are bent along their length to form sinuous paths from the region of the water spray assembly out through the top of the conduit 10.

Indirect coil assembly 16 is supported by coil brackets 74 which are comprised of a coil assembly having an array of tubes 66. Now referring to FIGS. 3 and 4, indirect coil assembly 16 according to either embodiment in FIGS. 1 and 2, comprises an upper manifold 56 and a lower manifold 58 which extend horizontally across the plurality of cooling tubes 66. The manifolds are held in place by means of brackets 60 on the side wall 26. Inlet and outlet fluid conduits 62 and 64 extend through the side wall 26 and communicate with the upper and lower manifolds 56 and 58 respectively. The inlet and outlet fluid conduits 62 and 64 may be reversed depending on the heat transfer process that is taking place. These fluid conduits are connected to receive a fluid to be cooled or condensed, for example the refrigerant from a compressor in an air conditioning system (not shown). A plurality of cooling tubes 66 are connected between the upper and lower manifolds 56 and 58. Each tube is preferably formed into a serpentine arrangement by means of 180 degree return bends 68 (and 70) near the side walls 26 and 28 so that different segments of each tube extend generally horizontally across the interior of the conduit 10 back and forth between the side walls 26 and 28 at different levels in the conduit along a vertical plane parallel and closely spaced to the plane of each of the other tubes 66. It will also be noted that the tubes 66 are arranged in alternately offset arrays. It can be seen that each of the manifolds 56 and 58 is provided with an upper and a lower row of openings to accept the tubes 66 at these two different levels. Typically there are tubes anywhere from 2 levels (shown) and up to eight levels. These tubes may have any suitable outside diameter D, such as ⅜"-2". However, in a preferred exemplary embodiment, they have a diameter of ⅝" to 1.05". The return 180 degree bends 68 may also have any suitable bend radius. Further, the corresponding levels of the segments of adjacent tubes should be offset vertically from each other by an amount approximately equal to the 180 degree bend radius. In order to support the tubes 66 at the bends 68 (and 70) there are provided horizontally extending support rods 72 which are mounted at the wall 26, between the brackets 60 and, at the wall 28, between brackets 74. The coil assembly 16 in cross-section comprises arrays of tube segments 66 arranged at different levels or elevations due to the offset arrangement of adjacent tubes. This assembly is similar to many prior coil assembly designs.

Figure 5A:
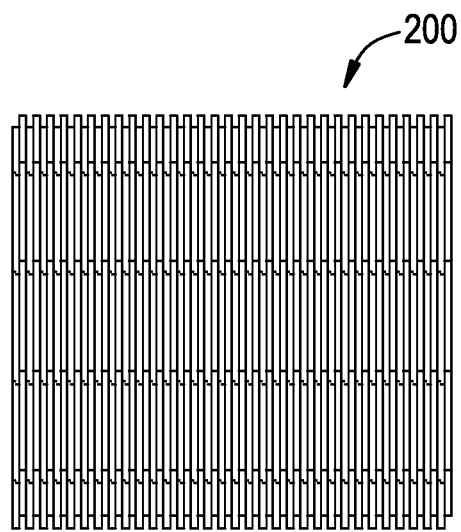
FIG. 5a is an end view of the preferred embodiment double serpentine coil tube bundle
Figure 5B:
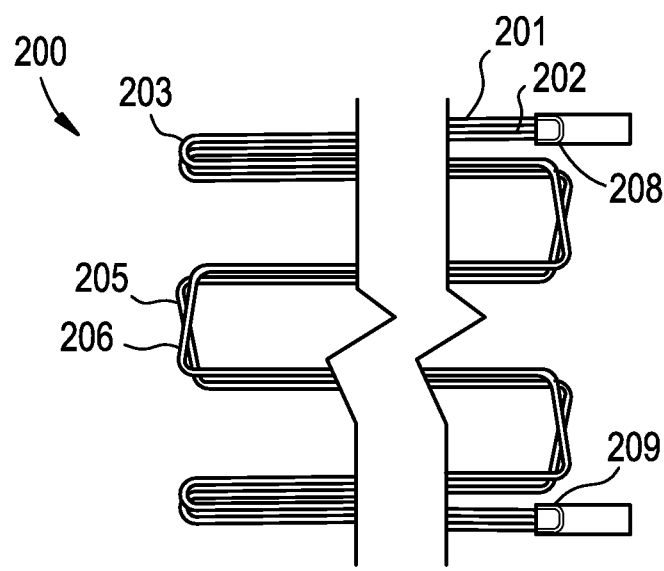
FIG. 5b is a side view of the preferred embodiment double serpentine coil tube bundle
Figure 5C:
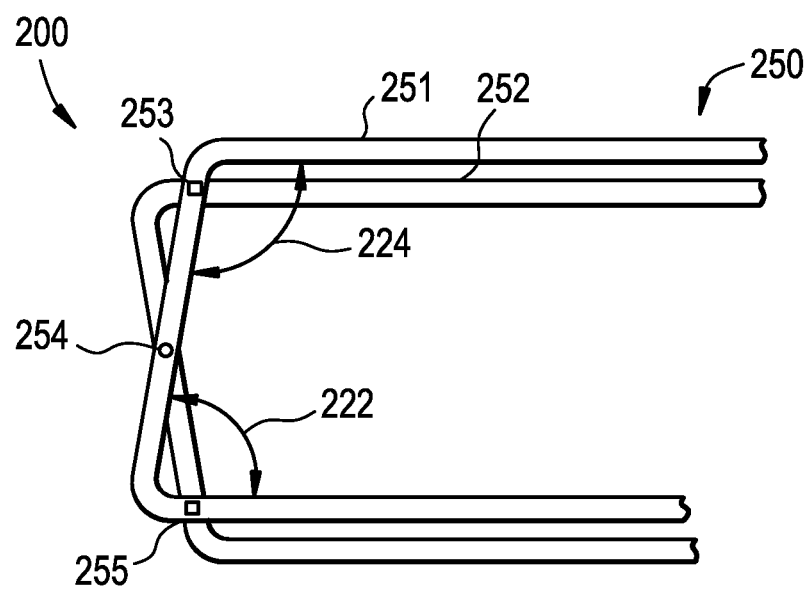
FIG. 5c is a side view of two circuit tubes of preferred embodiment double serpentine coil

Referring now to FIG. 5a, the preferred embodiment of the invention, double serpentine coil 200 is shown on an end view looking at the return bend section of the coil. FIG. 5b shows more detail looking at embodiment 200 from the side view. In FIG. 5b, upper circuit tube 201 and lower circuit tube 202 are connected to header 208 and go back and forth and connect back into bottom header 209. Note that on this coil design, there are a combination of tight return bends 203 at an approximate bend angle of 180 degrees and then two approximate 90 degree bends separated by straight tube runs 205 and 206 which create a desired separation between the generally horizontal tube runs. This desired separation of generally horizontal tube runs is to increase the spray cooling zone between tube runs which may be further enhanced by placing direct heat exchange sections between the separated tube runs as discussed in patent application Ser. Nos. 13/833,788, 13,833,971 and 62/061,894. Another reason for separating the generally horizontal tube runs by a vertical distance is to nest in more tube circuits as will be shown in the FIGS. 7, 8 and 9. FIG. 5c shows the design of the increased vertical height between generally horizontal tubes 251 and 252 for embodiment 200 such that they employ an under-break 224 of approximately 100 degrees and over-break 222 of approximately 80 degrees. These break tolerances can be within 10 degrees depending on the desired vertical separation of tube runs, desired tube slope, tube diameter and other engineering manufacturing tolerance factors and are not limitations to the invention. It should be noted that tube 251 has the same circuit design as tube 252 but is simply flipped before the coil is stacked. The result of providing an under break 224 followed by a straight tube run then providing over break 222 is to form the return bend that adds up to approximate 180 degree angle which allows return bends 205 and 206 to have three points of contact at points 253, 254, and 255 such that once the coil is assembled and pulled down, the tubes cannot shift on the return end side of the coil compared to prior art designs. This three point contact assures uniform spacing on the return bend end which allows for ease of circuit stacking, ease of coil pull-down, ease of manufacturing, reduction in production cost, produces a higher quality hot dip galvanizing process and is a more robust design that tolerates manufacturing variability issues such as variable tube circuit length and variable return bend angles. Uniform return bend spacing also reduces scaling relative to prior art designs which had wet/dry areas resulting from shadowed tubes which were non-uniformly spaced, provides for better inspection and access to the tubes in the return bend area, maintains uniform air passage around tubes, promotes better tube wetting of the return bend area, ultimately promoting higher quality heat exchange coils with unit thermal capacity improvement. These advantages will be described as higher quality and performance henceforth.

Figure 6:
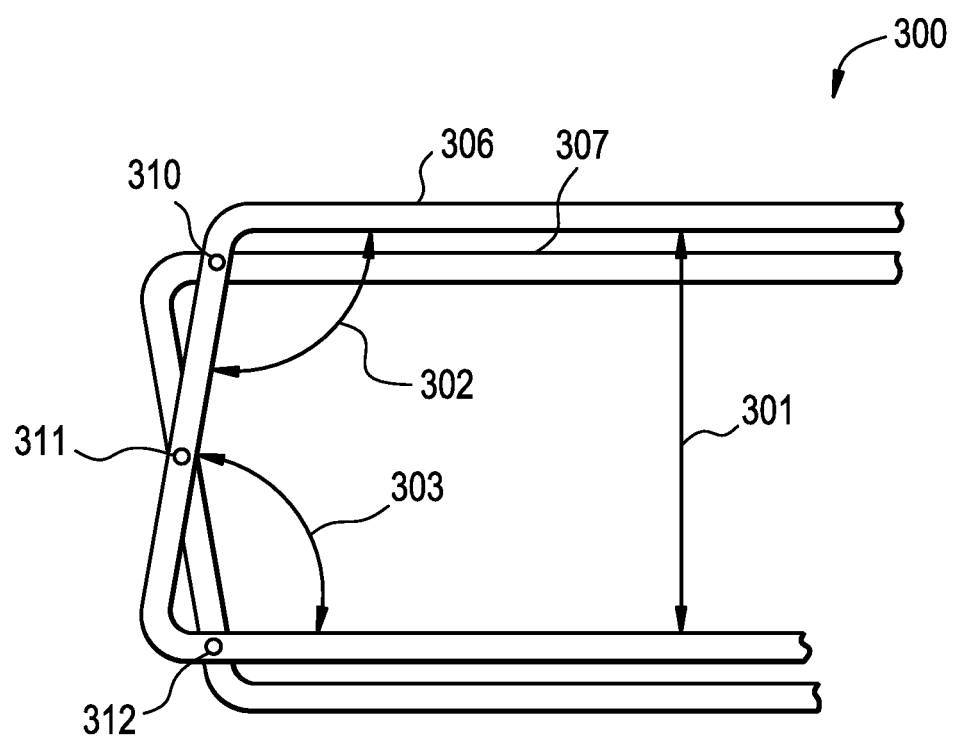
FIG. 6 is a side view of two circuit tubes of preferred embodiment double serpentine coil

Referring now to FIG. 6, embodiment 300, known in the art as a double serpentine arrangement, shows the intentional vertical distance 301 with previously described benefits located between generally horizontal tube runs 306 and 307. Tube circuit 306 has under-break 302 of approximately 100 degrees and over-break 303 of approximately 80 degrees. These break tolerances can be within 10 degrees depending on the desired vertical separation of tube runs, desired tube slope, tube diameter and other engineering manufacturing tolerance factors. It should be noted that tube circuit 307 has the same circuit design as tube 306 but is simply flipped before the coil is stacked. This circuit design allows return bends in circuit tube 306 and 307 to have three points of contact at points 310,311 and 312 so that once the coil is assembled or pulled down, the tubes cannot shift on the return end side of the coil compared to prior art designs. In addition to showing an improved circuiting arrangement discussed in patent application Ser. Nos. 13/833,788, 13,833,971 and 62/061,894, FIG. 6 also serves to show details of improving the circuit structures of the designs of Quad, Hex and Octo coils in subsequent FIGS. 7, 8 & 9.

Figure 7A:
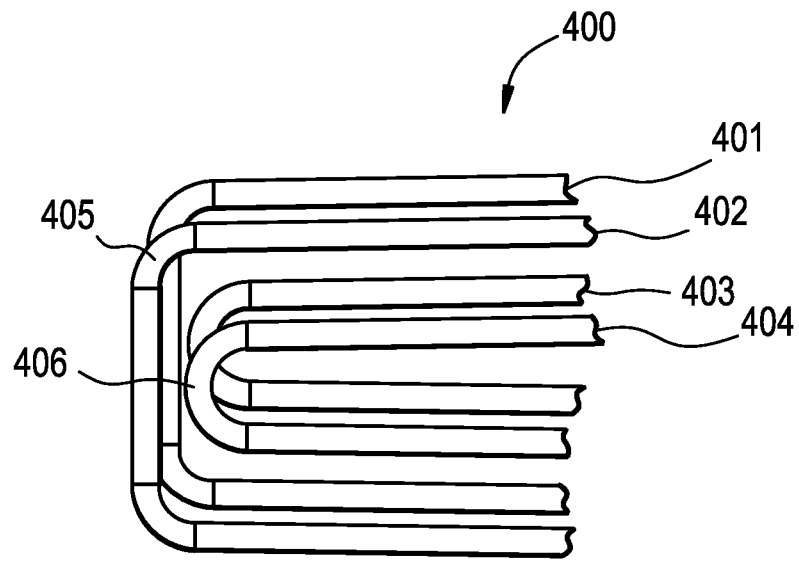
FIG. 7a is a side view of a prior art quad coil

Referring now to FIG. 7a, 400 is known as a prior art design quad-coil which now has four sets of tubes fed from the header (not shown). Outer tube sets 401 and 402 can be seen to be slightly offset from each other in vertical height and both have two approximate 90 degree bends separated by a straight tube run to form the approximate 180 degree return bend back to the next circuit pass. Note that outer tubes 401 and 402 touch each other at crossing point 405 even if the circuit lengths are not exactly equal. These tubes may also touch each other along the entire length of straight tube run between the two 90 degree bends. It is also possible that these circuits will only touch at the bottom (not shown). When the coil tubes are assembled and pulled down, due to manufacturing variability, it is possible that the tubes touch only at crossing point 405 or only at the bottom (not shown) and when this happens, the spacing between the tubes becomes non-uniform and in addition, when hot dip galvanizing, the return bend tubes may shift to a non-uniformly spaced pattern which decreases the quality of the coil. The last set of two tubes, 403 and 404, are nested inside of tubes 401 and 402 and these return bends are typically designed with a 180 degree return bends and as such touch at one point 406 and do not present an issue of non-uniform spacing due to their close vertical proximity.

Figure 7B:
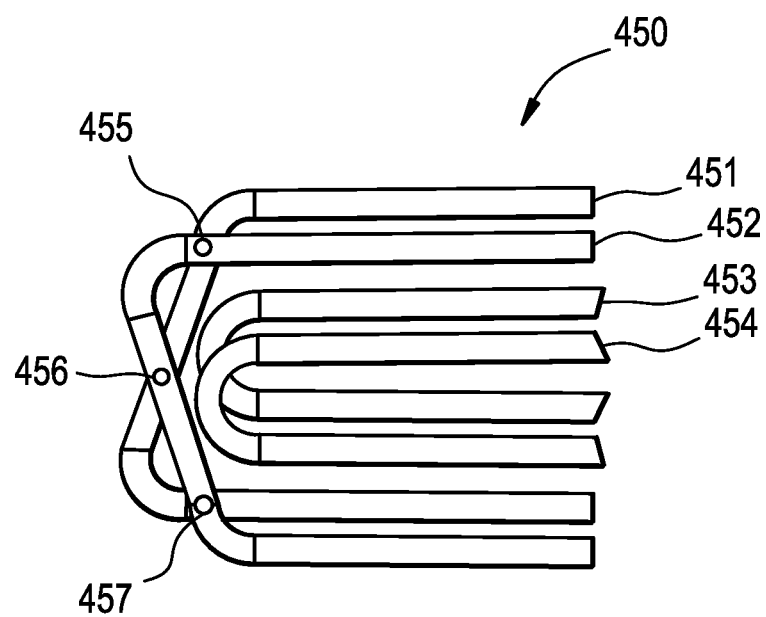
FIG. 7b is a side view of an embodiment of quad coil according to the present invention

Referring now to FIG. 7b, embodiment 450 of the invention shows the improved design of the quad-coil where outer tubes 451 and 452 employ an under-break of approximately 100 degrees and an over-break of approximately 80 degrees. Embodiment 450 forces three points of contact at points 455, 456 and 457 such that once the coil is assembled and pulled down, the tubes cannot shift on the return end side of the coil compared to the prior art design 400 in FIG. 7a. This three point contact assures uniform spacing and a higher quality and performance heat exchange apparatus. It should be noted that the last set of two tubes, 453 and 454, are nested inside of tubes 451 and 452 and these return bends are typically designed with a 180 degree return bends and as such touch at one point and do not present an issue of non-uniform spacing due to their close vertical proximity.

Figure 8A:
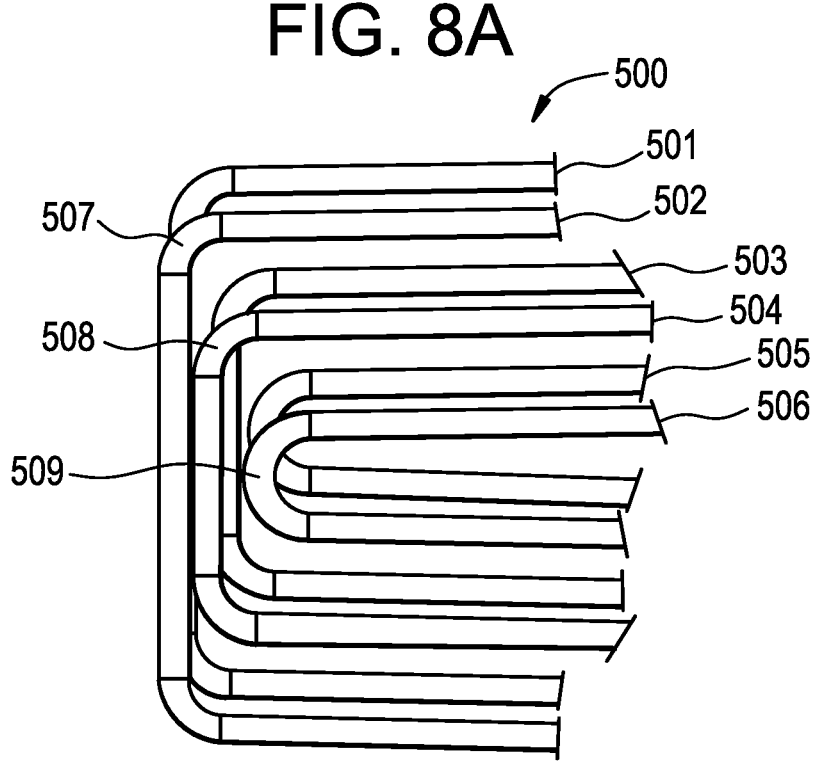
FIG. 8a is a side view of a prior art hex coil

Referring now to FIG. 8a, 500 is known as a prior art design hex-coil which now has six sets of tubes fed from the header (not shown). Outer tube sets 501 and 502 can be seen to be slightly offset from each other in vertical height and both have two approximate 90 degree bends separated by a straight tube run to form the approximate 180 degree return bend back to the next circuit pass. Note that outer tubes 501 and 502 touch each other at crossing point 507 even if the circuit lengths are not exactly equal. These tubes may also touch each other along the entire length of straight tube run between the two 90 degree bends. It is also possible that these circuits will only touch at the bottom (not shown). Inner tube sets 503 and 504 can be seen to be slightly offset from each other in vertical height and both have two approximate 90 degree bends separated by a straight tube run to form the approximate 180 degree return bend back to the next circuit pass. Note that inner tubes 503 and 504 touch each other at crossing point 508 even if the circuit lengths are not exactly equal. These tubes may also touch each other along the entire length of straight tube run between the two 90 degree bends. It is also possible that these circuits will only touch at the bottom (not shown). When the coil tubes are assembled and pulled down, due to manufacturing variability, it is possible that the tubes touch only at crossing points 507 and 508 (or at the bottom—not shown) and when this happens, the spacing between the tubes becomes non-uniform and in addition, when hot dip galvanizing, the tubes may shift to a non-uniform pattern which decreases the quality of the coil. Finally, the last set of two tubes, 505 and 506, are nested inside of tubes 503 and 504 and these return bends are typically designed with an approximate 180 degree return bend and as such touch at one point 509 and do not present an issue of non-uniform spacing due to their close vertical proximity.

Figure 8B:
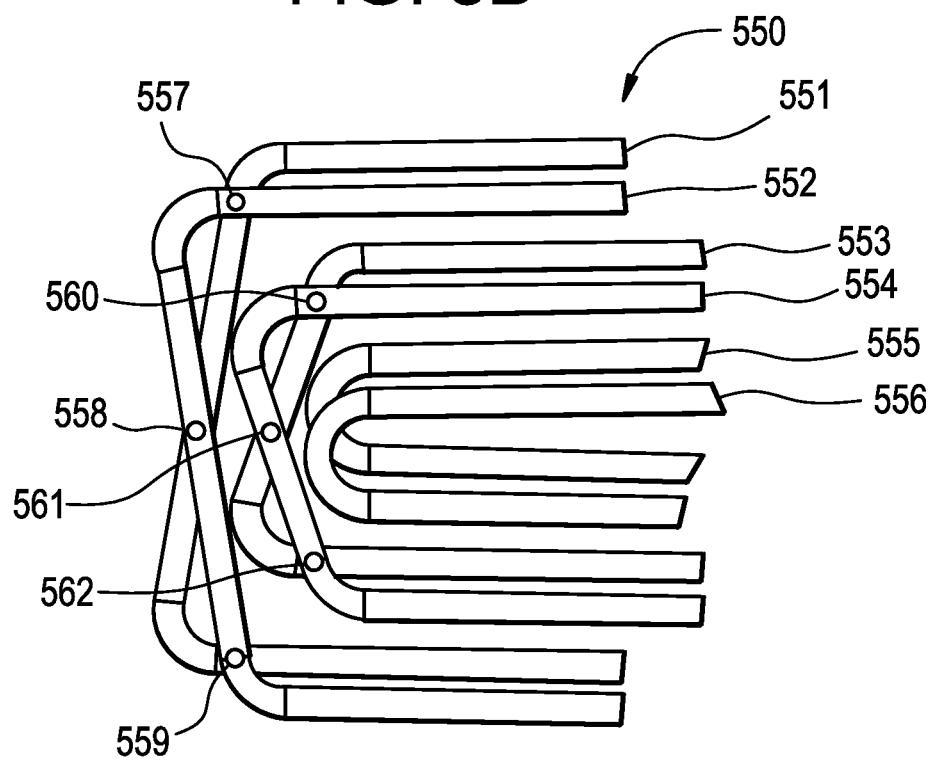
FIG. 8b is a side view of an embodiment of hex coil according to the present invention

Referring now to FIG. 8b, embodiment 550 of the invention shows the improved design of the hex-coil where outer tubes 551 and 552 employ an under-break of approximately 100 degrees and an over-break of approximately 80 degrees. Embodiment 550 also has inner tubes 553 and 554 employing an under-break of approximately 100 degrees and an over-break of approximately 80 degrees. This embodiment forces three points of contact at points 557, 558, and 559 and also at 560, 561 and 562 such that once the coil is assembled and pulled down, the tubes cannot shift on the return end side of the coil compared to the prior art design 500 in FIG. 8a. This three point contact assures uniform spacing and a higher quality and performance heat exchange apparatus. It should be noted that the last set of two tubes, 555 and 556, are nested inside of tubes 553 and 554 and these return bends are typically designed with a 180 degree return bends and as such touch at one point and do not present an issue of non-uniform spacing due to their close vertical proximity.

Figure 9A:
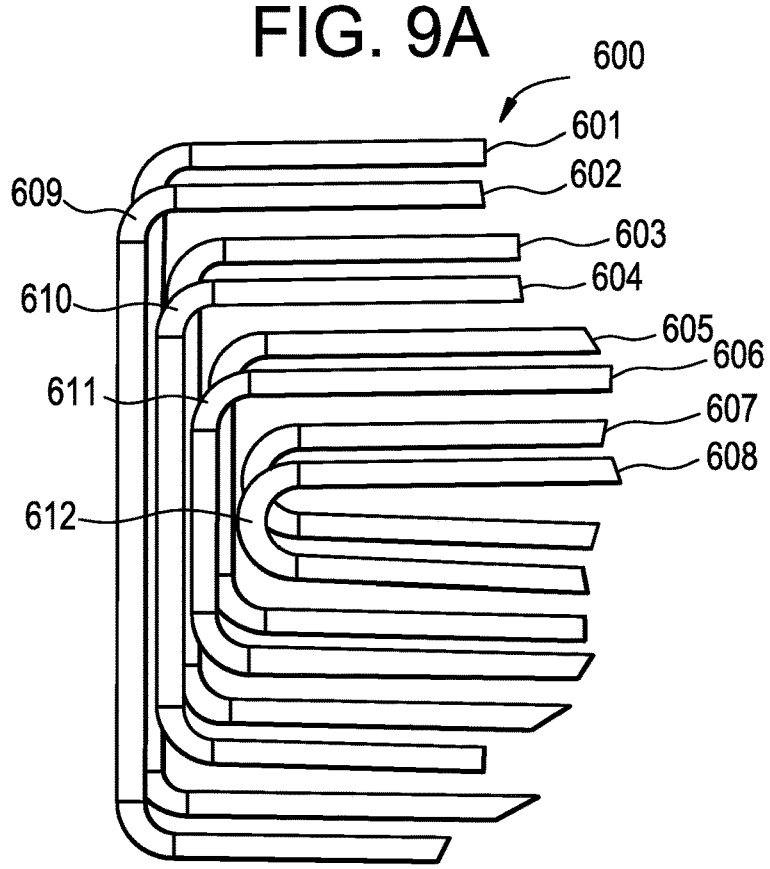
FIG. 9a is a side view of a prior art octo coil

Referring now to FIG. 9a, 600 is known as a prior art design a octo-coil which now has eight sets of tubes fed from the header (not shown). Outer tube sets 601 and 602 can be seen to be slightly offset from each other in vertical height and both have two approximate 90 degree bends separated by a straight tube run to form the approximate 180 degree return bend back to the next circuit pass. Note that outer tubes 601 and 602 touch each other at crossing point 609 even if the circuit lengths are not exactly equal. These tubes may also touch each other along the entire length of straight tube run between the two 90 degree bends. It is also possible that these circuits will only touch at the bottom (not shown). Inner tube sets 603 and 604 can be seen to be slightly offset from each other in vertical height and both have two approximate 90 degree bends separated by a straight tube run to form the approximate 180 degree return bend back to the next circuit pass. Note that inner tubes 603 and 604 touch each other at crossing point 610 even if the circuit lengths are not exactly equal. These tubes may also touch each other along the entire length of straight tube run between the two 90 degree bends. It is also possible that these circuits will only touch at the bottom (not shown). Inner tube sets 605 and 606 can be seen to be slightly offset from each other in vertical height and both have two approximate 90 degree bends separated by a straight tube run to form the approximate 180 degree return bend back to the next circuit pass. Note that inner tubes 605 and 606 touch each other at crossing point 611 even if the circuit lengths are not exactly equal. These tubes may also touch each other along the entire length of straight tube run between the two 90 degree bends. It is also possible that these circuits will only touch at the bottom (not shown). When the coil tubes are assembled and pulled down, due to manufacturing variability, it is possible that the tubes touch only at crossing points 609, 610, and 611 (or at the bottom—not shown) and when this happens, the spacing between the tubes becomes non-uniform and in addition, when hot dip galvanizing, the tubes may shift to a non-uniform pattern which decreases the quality of the coil. Finally, the last set of two tubes, 607 and 608, are nested inside of tubes 605 and 606 and these return bends are typically designed with an approximate 180 degree return bend and as such touch at crossing point 612 and do not present an issue of non-uniform spacing due to their close vertical proximity.

Figure 9B:
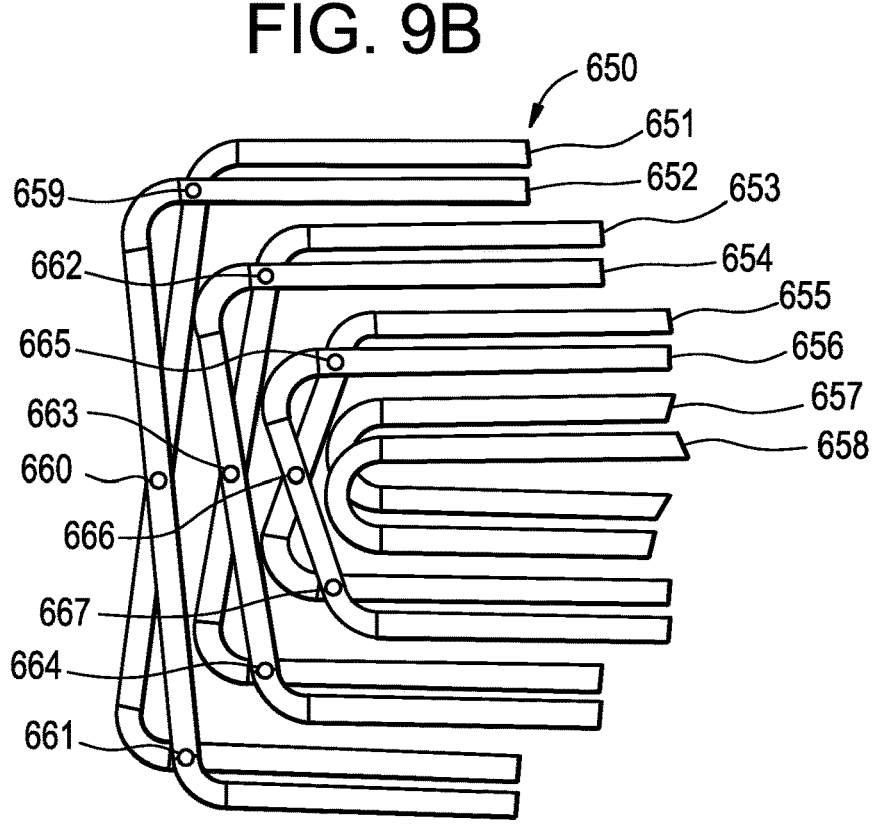
FIG. 9b is a side view of an embodiment of octo coil according to the present invention

Referring now to FIG. 9b, embodiment 650 of the invention shows the improved design of the octo-coil with outer tubes 651 and 652 employing an under-break of approximately 100 degrees and an over-break of approximately 80 degrees. Embodiment 650 also has inner tubes 653 and 654 employing an under-break of approximately 100 degrees and an over-break of approximately 80 degrees. Embodiment 650 also has inner tubes 655 and 656 employing an under-break of approximately 100 degrees and an over-break of approximately 80 degrees. This embodiment forces three points of contact at points 659, 660 and 661 and also at 662, 663 and 664 and also at 665, 666, and 667 such that once the coil is assembled and pulled down, the tubes cannot shift on the return end side of the coil compared to the prior art design 600 in FIG. 9a. This three point contact assures uniform spacing and a higher quality and performance heat exchange apparatus. It should be noted that the last set of two tubes, 657 and 658, are nested inside of tubes 655 and 656 and these return bends are typically designed with a 180 degree return bends and as such touch at one point and do not present an issue of non-uniform spacing due to their close vertical proximity.

What is claimed is:

1. An indirect heat exchange assembly comprising:
   an inlet header and an outlet header,
   a first series of tubes, each tube of the first series extending from the inlet header to the outlet header,
   a second series of tubes, each tube of the second series extending from the inlet header to the outlet header,
   each tube of the first series comprising a first straight run section, a second straight run section, and at least one return bend section,
   each tube of the second series comprising a third straight run section, a fourth straight run section, and at least one return bend section,
   wherein the at least one return bend section of the first series of tubes includes:
   a first straight tube run;
   a first bend having an angle greater than 90 degrees connecting the first straight tube run to the first straight run section of the first series of tubes, and
   a second bend having an angle of less than 90 degrees connecting the first straight tube run to the second straight run section of the first series of tubes,
   wherein the at least one return bend section of the second series of tubes is adjacent the at least one return bend section of the first series of tubes and includes:
   a second straight tube run;
   a first bend having an angle greater than 90 degrees connecting the second straight tube run and the fourth straight run section of the second series of tubes, and
   a second bend having an angle less than 90 degrees connecting the second straight tube run and the third straight run section of the second series of tubes,
   wherein the at least one tube return bend section of the first series of tubes contacts the adjacent tube return bend section of the second series of tubes in at least three separate points of contact, the three separate points of contact comprising:
   a first point of contact between the first straight tube run of the first series of tubes and the second straight tube run of the second series of tubes,
   a second point of contact between the first straight tube run of the first series of tubes and the third straight run section of the second series of tubes, the second bend of the return bend section of the second series of tubes being intermediate the first point of contact and the second point of contact along the second series of tubes, and
   a third point of contact between the second straight run section of the first series of tubes and the second straight tube run of the second series of tubes, and
   wherein the at least three contact points are configured to lock the return bend sections together to maintain uniform spacing between the first and second series of tubes.

2. The indirect heat exchange assembly of claim 1 wherein the first series of tubes comprises at least one separate tube and the second series of tubes comprises at least one separate tube.

3. The indirect heat exchange assembly of claim 1 wherein the first series of tubes comprises at least two separate tubes and the second series of tubes comprises at least two separate tubes.

4. The indirect heat exchange assembly of claim 1 wherein the first series of tubes comprises at least four separate tubes and the second series of tubes comprises at least four separate tubes.

5. The indirect heat exchange assembly of claim 1, wherein the first straight tube run and the second straight tube run each have a length of at least two inches.

6. The indirect heat exchange assembly of claim 5, wherein the first and second straight tube runs form a gap of the first and second series of tubes.

7. The indirect heat exchange assembly of claim 6, wherein the gap has a height of at least two inches.

8. The indirect heat exchange assembly of claim 1, wherein the first series of tubes has a vertical offset from the second series of tubes.

9. An indirect heat exchange assembly comprising:
   an inlet header and an outlet header, a first series of tubes extending from the inlet header to the outlet header, the first series of tubes including a first tube comprising:
  a plurality of straight run sections including a first straight run section and a second straight run section,
  a first inner return bend area comprising a first inner bend having a bend angle of 180 degrees, and
  a first outer return bend area between the first and second straight run sections and extending about the first inner return bend area, the first outer return bend area comprising a first straight tube run, a first outer bend having a bend angle greater than 90 degrees connecting the first straight tube run to the first straight run section, and a second outer bend having a second bend angle less than 90 degrees connecting the first straight tube run to the second straight run section, and wherein the first straight tube run has a length of at least two inches,
a second series of tubes extending from the inlet header to the outlet header, the second series of tubes including a second tube comprising:
  a plurality of straight run sections including a third straight run section and a fourth straight run section,
  a second inner return bend area comprising a second inner bend having a bend angle of 180 degrees, and
  a second outer return bend area between the third and fourth straight run sections and extending about the inner return bend, the second outer return bend area comprising a second straight tube run, a first outer bend having a bend angle greater than 90 degrees connecting the second straight tube run to the fourth straight run section, and a second outer bend having a second bend angle less than 90 degrees connecting the second straight tube run to the third straight run section, and wherein the second straight tube run has a length of at least two inches,
wherein the first tube contacts the second tube in at least three separate contact points including:
a first contact point between the first straight tube run of the first tube and the third straight run section of the second tube;
a second contact point between the first straight tube run of the first tube and the second straight tube run of the second tube, the second outer bend of the second tube being intermediate the first and second contact points along the second tube;
a third contact point between the second straight run section of the first tube and the second straight tube run of the second tube, and
wherein the at least three contacts points are configured to lock the return bend areas together to maintain uniform spacing between the first and second series of tubes.

10. The indirect heat exchange assembly of claim 9, wherein the second bend angle of the second outer bend of the first tube is 80 degrees and the bend angle of the first outer bend of the first tube is 100 degrees.

11. The indirect heat exchange assembly of claim 10, wherein the second bend angle of the second outer bend of the second tube is 80 degrees and the bend angle of the first outer bend of the second tube is 100 degrees.

12. The indirect heat exchange assembly of claim 9, wherein the straight run sections of the first series of tubes are separated by at least one gap.

13. The indirect heat exchange assembly of claim 12, wherein the at least one gap is at least two inches in height.

14. The indirect heat exchange assembly of claim 9, wherein the first series of tubes has a vertical offset from the second series of tubes.

15. An indirect heat exchange assembly comprising:
an inlet header and an outlet header,
a first tube extending from the inlet header to the outlet header, the first tube having a first straight run section, a second straight run section, and at least one return bend section, the at least one return bend section comprising:
  a first straight tube run;
  a first bend with an angle greater than 90 degrees connecting the first straight tube run to the first straight run section of the first tube, and
  a second bend with an angle less than 90 degrees connecting the first straight tube run to the second straight run section of the first tube,
a second tube extending from the inlet header to the outlet header, the second tube having a third straight tube run, a fourth straight tube run, and at least one return bend section, the at least one return bend section comprising:
  a second straight tube run;
  a first bend with an angle greater than 90 degrees connecting the second straight tube run to the fourth straight run section of the second tube, and
  a second bend with an angle less than 90 degrees connecting the second straight tube run to a third straight run section of the second tube,
wherein the first straight tube run of the first tube contacts the second straight tube run of the second tube at a first contact point, wherein the first straight tube run of the first tube contacts the third straight run section of the second tube at a second contact point, the second bend of the second tube being intermediate the first point of contact and the second point of contact along the second tube, and wherein the second straight run section of the first tube contacts the second straight tube run of the second tube at a third contact point, and
wherein the first contact point, second contact point, and the third contact point are configured to lock the return bend areas together to maintain uniform spacing between the first and second tubes.

16. The indirect heat exchange assembly of claim 15 wherein the first tube has a vertical offset from the second tube.

* * * * *